May 12, 1931. H. C. CLAUSEN 1,805,307

RAILWAY CAR RETARDER

Filed Sept. 24, 1930

INVENTOR:
H. C. Clausen,
BY
His ATTORNEY

Patented May 12, 1931

1,805,307

UNITED STATES PATENT OFFICE

HAROLD C. CLAUSEN, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY CAR RETARDER

Application filed September 24, 1930. Serial No. 484,085.

My invention relates to railway car retarders of the type involving braking bars located beside a track rail and movable toward and away from the rail to engage the wheels of a car, and thereby retard the motion of the car.

In one form of car retarder of the type described, the braking bars are moved toward the track rail, in response to movement of the bars parallel to the rail, by means of resilient links which are connected between the braking bars and trunnions pivotally supported in the trackway. These links are usually so constructed and are so connected with the braking bars and the trunnions that, when a braking bar is engaging a car wheel, the pressure between the braking bar and the car wheel will cause the bar to move upwardly, so that the wheel engaging surface of the bar will rise and will bear against the wheel at a higher point than if the bar remained in the same horizontal plane, thereby increasing the retarding effect for a given force applied to the braking bar. After a braking bar has been raised in this manner, it is important that the braking bar should drop back to its normal position as soon as the car has passed out of the retarder. One object of my invention is the provision of a novel link structure so constructed that the dropping back action of the braking bars may be regulated.

Another object of my invention is the provision of a novel link structure by means of which the raising of the braking bars may, if desired, be accentuated.

I will describe two forms of link structures embodying my invention, and will then point out the novel features thereof in claims.

Figure 2:
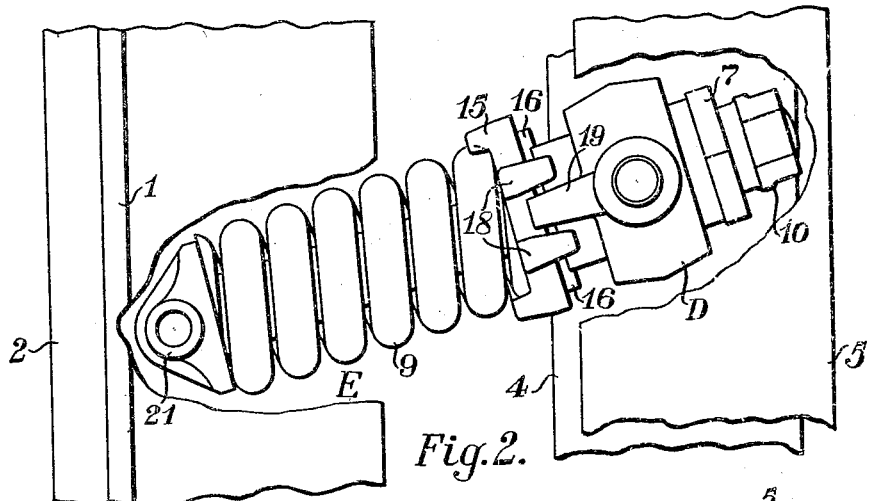
Figure 1:
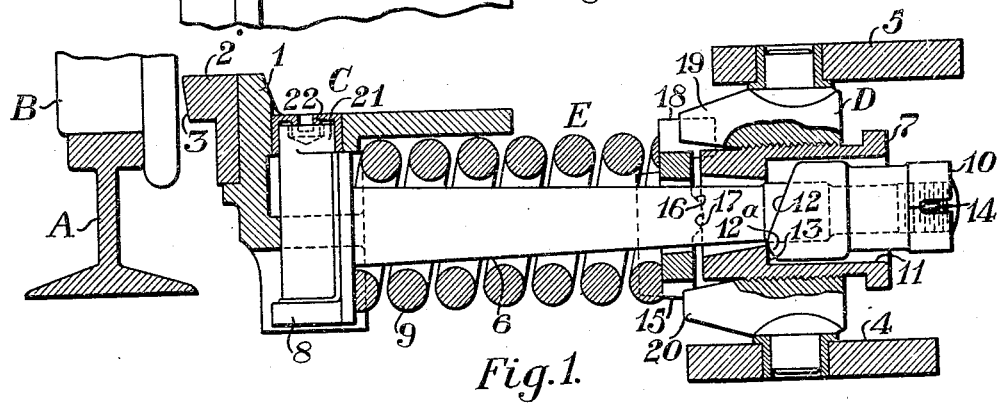
Figure 4:
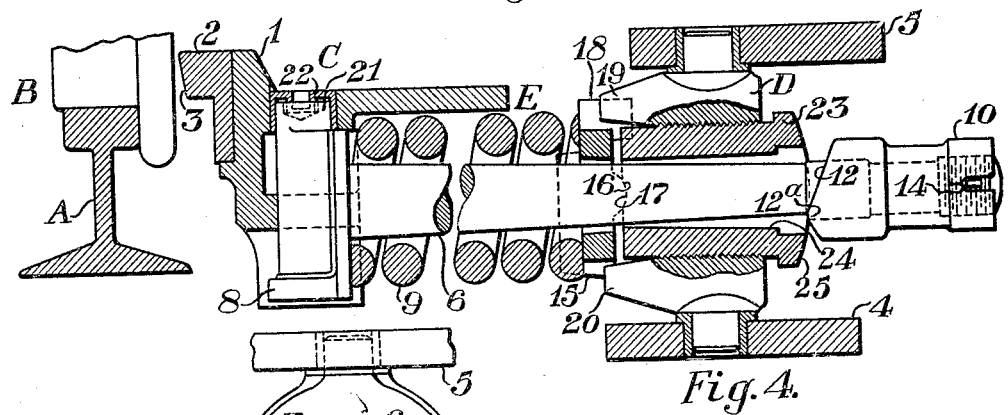
Figure 3:
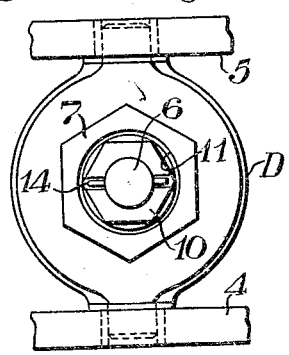

In the accompanying drawings, Fig. 1 is a sectional view showing a car retarder provided with one form of link structure embodying my invention. Fig. 2 is a top plan view of the link structure shown in Fig. 1. Fig. 3 is an end view of the link structure shown in Figs. 1 and 2. Fig. 4 is a sectional view showing a car retarder provided with a modified form of the link structure shown in Fig. 1, and also embodying my invention.

Similar reference characters refer to similar parts in all four views.

Referring first to Fig. 1, the reference character A designates one track rail of a stretch of railway track upon which is shown a car wheel B, and the reference character C designates the braking bar of a car retarder. The braking bar C extends parallel to the track rail A, and comprises a brake beam 1 provided with a brake shoe 2 having a wheel engaging surface 3.

Located adjacent the braking bar C is a trunnion D which is pivotally supported in the trackway between two vertically spaced stringers 4 and 5 which extend parallel to the braking bar C. The trunnion D is connected with the braking bar C by means of a link structure E embodying my invention, which structure I will now describe.

Referring now also to Figs. 2 and 3, the link structure E, as here shown, comprises a bolt 6, the shank of which extends with considerable clearance through a sleeve 7 threaded into the trunnion D. Interposed between the head 8 of the bolt 6 and the sleeve 7, is a heavy coil spring 9 which may be drawn up to a predetermined pressure by means of a nut 10 screwed onto the shank of the bolt. The nut 10 extends with considerable clearance into a cylindrical bore 11 in the right-hand, or outer end of the sleeve 7, as shown in Fig. 1, and is provided at its inner end with a cam surface 12 which is hardened to eliminate wear. The cam surface 12 is formed with a substantially wedge shaped projecting portion $12^a$, the vertex of which is located at one side of the axis of the nut. The projecting portion $12^a$ engages a flat vertically extending circular shoulder 13 formed in the sleeve 10 at the inner end of the bore 11 and, as here shown, the nut is turned to such a position that the region of contact between the shoulder and the projecting portion $12^a$ is located below the axis of the bolt 6 and spring 9 in a substantially horizontal plane. The nut 10 may be locked in its adjusted position by means of a cotter pin 14. Interposed between the right-hand end of the spring 9 and the left-hand end of the sleeve 7, is a locking collar 15 having a rib 16 which enters a grove 17 cut across the face of the sleeve 7. Collar 15 is also provided with two lugs 18, (Fig. 2) which cooperate with a tongue 19 formed on the upper end of the trunnion D or, in case the collar is rotated through an angle of 180°, with a tongue 20 formed on the lower side of the trunnion D, to prevent movement of the collar with respect to the trunnion. In actual practice, the parts are adjusted by first drawing up the nut 10 until the spring 9 is compressed to the desired pressure. Sleeve 7 is then screwed into or out of the trunnion D to obtain the proper distance between the trunnion and the head of the bolt. The parts are then locked in their adjusted positions by engagement of the rib 16 with the sleeve 7, thereby preventing displacement of the parts.

The link structure is connected with the braking bar by means of an upstanding post 21 formed on the head 8 of the bolt 6, which post is journaled in a bearing 22 located in the upper portion of the brake beam 1, as best seen in Fig. 1.

It will be noted in Fig. 2 that the link structure E is disposed at an angle with the braking bar. It will be apparent, therefore, that if the braking bar is moved parallel to the rail A, it will also be moved into or out of engagement with the flange of the wheel B, depending upon the direction of movement of the braking bar. The means for moving the braking bar parallel to the rail forms no part of my invention, and is therefore not shown in the drawing. One form of mechanism for moving the braking bar parallel to the rail is shown and described in the application for Letters Patent of the United States, Serial No. 307,895, filed by Herbert L. Bone on September 24, 1928.

With the parts constructed and arranged in the manner described, it will be seen that, when the braking bar is moved into engagement with the wheel B, spring 9 becomes compressed, so that the force applied to the braking bar is proportional to the amount of compression of the spring 9. It will also be seen that the point of application of the force applied to the braking bar is lower than the point of reaction established by contact of the brake shoe 2 with the car wheel, and a couple is therefore created which causes the braking bar and link structure to rotate upwardly about the region of contact between the projecting portion 12ª of the cam surface 12 and the shoulder 13, so that the wheel engaging surface 3 engages the car wheel at a higher, and therefore a more effective region, than would be the case if this rotation did not occur. This rotation of the braking bar and link structure is permitted by the clearance between the nut 10 and the bore 11, and between the shank of the bolt and the sleeve.

I will now assume that after the braking bar has been raised by engagement of the braking bar with the car wheel, the car wheel moves out of the car retarder. The force of the compressed spring 9 then acts, through a lever arm which is equal to the distance below the axis of the bolt 6 and spring 9 at which the projecting portion 12ª of the cam surface 12 engages the shoulder 13, to exert a force on the braking bar which tends to restore the braking bar to its normal position. The length of this lever arm may be varied by constructing the nut 10 with the projecting portion 12ª of the cam surface 12 located at a greater or lesser distance from the axis of the nut and it will be apparent, therefore, that, with link structures embodying my invention, the amount of the dropping back action of the braking bar may be adjusted to any desired value.

It will also be apparent from an inspection of the drawing, that by turning the nut 10 through an angle of 180° so that the region of contact between the projecting portion 12ª of the nut 10 is located above the axis of the bolt 6 and spring 9, instead of below the axis of these members as shown in the drawings, the force tending to raise the braking bar C when the bar is engaging a car wheel, may be accentuated.

Referring now to Fig. 4, the apparatus here shown is similar to that shown in Fig. 1 with the exception that the shank of the bolt 6 has been lengthened, and that the sleeve 7 shown in Fig. 1 has been replaced by a sleeve 23 provided with a frusto-conical bore 24 having its smaller end located adjacent one end of the spring 9. Furthermore, as here shown the projecting portion 12ª of the cam surface 12 of the nut 10, instead of engaging a flat vertically extending surface, engages a convex surface 25 formed on the outer end of the sleeve 23.

The operation of the apparatus shown in Fig. 4 is substantially the same as that shown in Fig. 1, and will be readily understood from an inspection of the drawings.

It should be pointed out that while I have illustrated the surface which the projecting portion 12ª of the cam surface 12 engages in Fig. 1, as flat, and that which it engages in Fig. 2, as convex, it may under certain conditions, be desirable to make the surface which the projecting portion engages concave in order to obtain the desired operation of the link structure.

Although I have herein shown and described only two forms of link structures embodying my invention, it is understood that various changes and modifications may be made therein within the scope of the appended claims without departing from the spirit and scope of my invention.

Having thus described my invention, what I claim is:

1. In combination, a braking bar located beside a track rail and movable into engagement with the wheels of a car for retarding the motion of the car, a sleeve pivotally supported in the trackway, a bolt having its head pivotally connected with said braking bar and having its shank extending through said sleeve with sufficient clearance to permit limited movement of said bolt with respect to said sleeve, a compression spring on said bolt between its head and said sleeve, and a nut screwed onto the shank of said bolt for compressing said spring, said nut being provided with a cam surface having a projecting portion which engages said sleeve at a region of contact which is located outside of the axis of said bolt.

2. In combination, a braking bar located beside a track rail and movable into engagement with the wheels of a car for retarding the motion of the car, a sleeve pivotally supported in the trackway, a bolt having its head pivotally connected with said braking bar and having its shank extending through said sleeve with sufficient clearance to permit limited movement of said bolt with respect to said sleeve, a compression spring on said bolt between its head and said sleeve, and a nut screwed onto the shank of said bolt for compressing said spring, said nut being provided with a cam surface having a projecting portion which engages said sleeve at a region of contact which is located below the axis of said bolt in a substantially horizontal plane, whereby said spring exerts a downward force on said braking bar.

3. In combination, a braking bar located beside a track rail and movable into engagement with the wheels of a car for retarding the motion of the car, a sleeve pivotally supported in the trackway, a bolt having its head pivotally connected with said braking bar and having its shank extending through said sleeve with sufficient clearance to permit limited movement of said bolt with respect to said sleeve, a compression spring on said bolt between its head and said sleeve, and a nut screwed onto the shank of said bolt for compressing said spring, said nut being provided with a substantially wedge shaped cam surface which engages said sleeve on a substantially horizontal line below the axis of said bolt.

4. In combination, a braking bar located beside a track rail and movable into engagement with the wheels of a car for retarding the motion of the car, a sleeve pivotally supported in the trackway, a bolt having its head pivotally connected with said braking bar and having its shank extending through said sleeve with sufficient clearance to permit limited movement of said bolt with respect to said sleeve, a compression spring on said bolt between its head and said sleeve, and a nut screwed onto the shank of said bolt for compressing said spring, said nut being provided with a substantially wedge shaped cam surface which engages said sleeve in a substantially horizontal line below the axis of said bolt, whereby said spring exerts a downward force on said braking bar.

5. In combination, a braking bar located beside a track rail and movable into engagement with the wheels of a car for retarding the motion of the car, a sleeve pivotally supported in the trackway, a bolt having its head pivotally connected with said braking bar and having its shank extending through said sleeve with sufficient clearance to permit limited movement of said bolt with respect to said sleeve, a compression spring on said bolt between its head and said sleeve, and a nut provided with a cam surface having a substantially wedge shaped projection located at one side of the axis of said nut, said nut being screwed onto the shank of said bolt for compressing said spring in such manner that said projection engages a bearing surface on the opposite side of said sleeve from said spring.

6. In combination, a braking bar located besides a track rail and movable into engagement with the wheels of a car for retarding the motion of the car, a sleeve pivotally supported in the trackway, a bolt having its head pivotally connected with said braking bar and having its shank extending through said sleeve with sufficient clearance to permit limited movement of said bolt with respect to said sleeve, a compression spring on said bolt between its head and the inner end of said sleeve, and a nut provided with a cam surface having a substantially wedge shaped projection located at one side of the axis of said nut, said nut being screwed onto the shank of said bolt for compressing said spring in such manner that said projection engages a convex surface provided on the outer end of said sleeve.

7. In combination, a braking bar located beside a track rail and movable into engagement with the wheels of a car for retarding the motion of the car, a sleeve pivotally supported in the trackway and provided with a flat circular shoulder, a bolt having its head pivotally connected with said braking bar and having its shank extending through said sleeve with sufficient clearance to permit limited movement of said bolt with respect to said sleeve, a compression spring on said bolt between its head and said sleeve, and a nut provided with a cam surface having a substantially wedge shaped projection spaced from the axis of said nut, said nut being screwed onto the shank of said bolt on the opposite side of said sleeve from said spring with the wedge shaped projection engaging said circular shoulder.

8. In combination, a braking bar located beside a track rail and movable into engagement with the wheels of a car for retarding the motion of the car, a sleeve pivotally supported in the trackway and provided with a flat circular shoulder, a bolt having its head pivotally connected with said braking bar and having its shank extending through said sleeve with sufficient clearance to permit limited movement of said bolt with respect to said sleeve, a compression spring on said bolt between its head and said sleeve, and a nut provided with a cam surface having a substantially wedge shaped projection spaced from the axis of said nut, said nut being screwed onto the shank of said bolt on the opposite side of said sleeve from said spring with the wedge shaped projection engaging said circular shoulder below the axis of said bolt.

9. In combination, a braking bar located beside a track rail and movable into engagement with the wheels of a car for retarding the motion of the car, a sleeve pivotally supported in the trackway and provided at one end with a convex surface, a bolt having its head pivotally connected with said braking bar and having its shank extending through said sleeve with sufficient clearance to permit limited movement of said bolt with respect to said sleeve, a compression spring on said bolt between its head and said sleeve, and a nut provided with a cam surface having a substantially wedge shaped projection spaced from the axis of said nut, said nut being screwed onto the shank of said bolt on the opposite side of said sleeve from said spring with the wedge shaped projection engaging said convex surface.

10. In combination, a braking bar located beside a track rail and movable into engagement with the wheels of a car for retarding the motion of the car, a sleeve pivotally supported in the trackway and provided at one end with a bore terminating at its inner end in a circular shoulder having a flat vertically extending surface, a bolt having its head pivotally connected with said braking bar and having its shank extending through said sleeve with sufficient clearance to permit limited movement of said bolt with respect to said sleeve, a compression spring on said bolt btween its head and said sleeve, and a nut provided with a cam surface having a substantially wedge shaped projection spaced from the axis of said nut, said nut being screwed onto the shank of said bolt on the opposite side of said sleeve from said spring and fitting in said bore with clearance and having the projecting portion of said cam surface engaging said shoulder below the axis of said bolt, whereby said spring exerts a downward force on said braking bar.

In testimony whereof I affix my signature.

HAROLD C. CLAUSEN.